United States Patent [19]

Lee

[11] Patent Number: 5,344,107

[45] Date of Patent: Sep. 6, 1994

[54] TUBING STRAP

[75] Inventor: William R. Lee, Ventura, Calif.

[73] Assignee: Hall Surgical, Carpinteria, Calif.

[21] Appl. No.: 125,390

[22] Filed: Sep. 23, 1993

[51] Int. Cl.⁵ .............................................. F16L 3/00
[52] U.S. Cl. ......................................... 248/60; 24/298
[58] Field of Search ....................... 248/58, 60, 61, 62, 248/63, 51, 65, 68.1, 73, 74.1; 24/17 AP, 16 PB, 298, 302

[56] References Cited

U.S. PATENT DOCUMENTS

| | | | |
|---|---|---|---|
| 3,416,198 | 12/1968 | Geininger | 24/16 PB |
| 3,525,128 | 8/1970 | Hidassy | 24/16 PB |
| 3,576,054 | 4/1971 | Rynk | 24/16 PB |
| 4,705,245 | 10/1987 | Osada | 24/16 PB X |
| 5,135,188 | 8/1992 | Anderson et al. | 248/74.3 |

*Primary Examiner*—Ramon O. Ramirez
*Attorney, Agent, or Firm*—Todd A. Dawson

[57] ABSTRACT

The tube strap of this invention includes a first end having a hole for accommodating a tube therethrough and a second hook end having a handle extending generally transverse to the hook end. The first and second ends are spaced by a shaft portion. The tube strap is flexible and is preferably formed from a silicone substance which can sustain repeated sterilization without detrimentally effecting its integrity. In use, the tube strap is carried by a support tube or hose passing through the opening in the first end. It is preferred that the strap be slid onto the tube by the supplier of the tubing at the time of manufacturing. The tube strap may be used in three basic variations to bundle or restrain tubes or hoses in a more manageable grouping. The strap could be wrapped around adjacent tubes with the hook engaging the shaft. The strap can be wrapped around adjacent tubes with the hook engaging the support tube which passes through the first end. Finally, the strap can be used as a hanger with the hook engaging a support arm or tube.

8 Claims, 1 Drawing Sheet

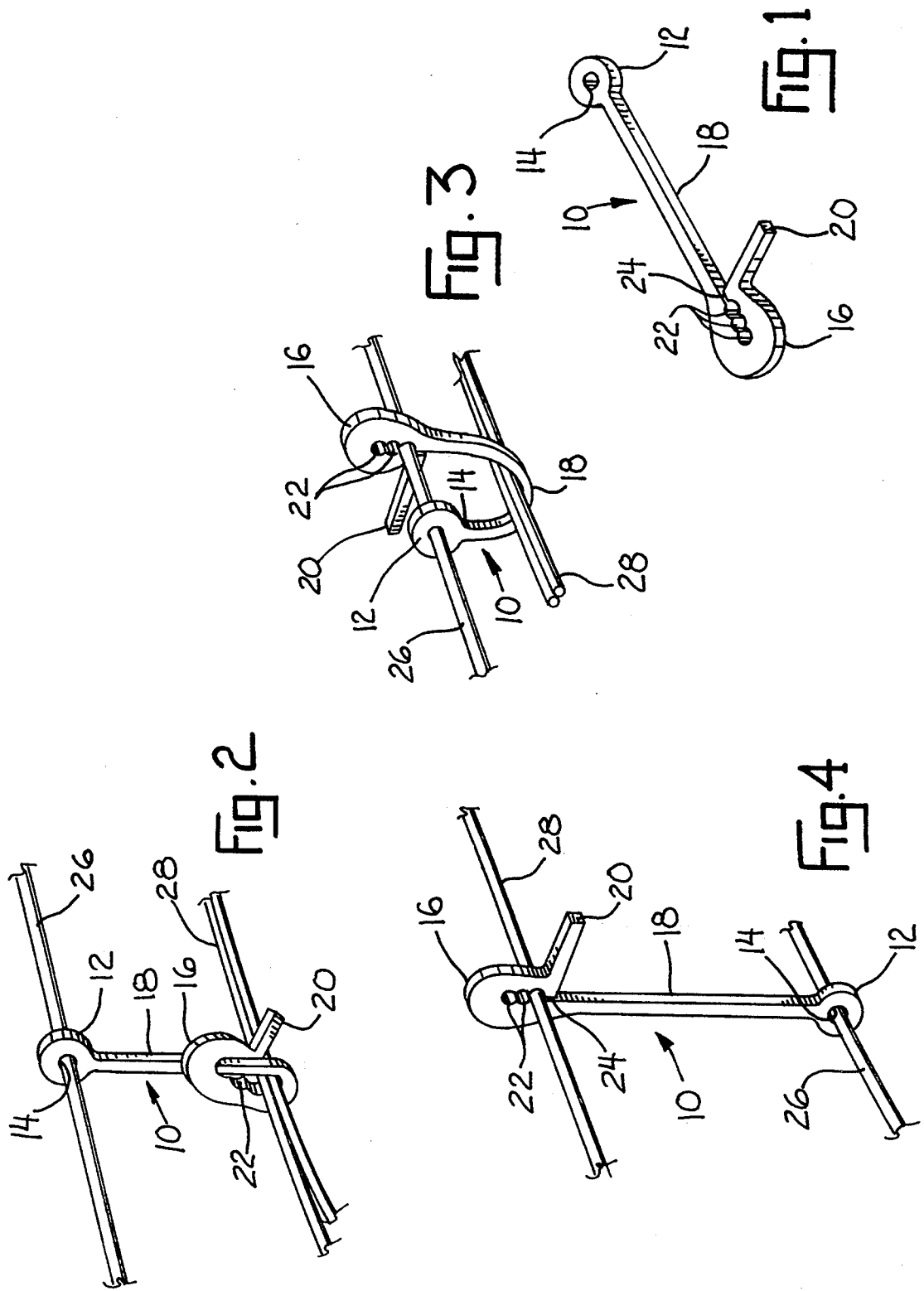

TUBING STRAP

FIELD OF THE INVENTION

This invention relates to a strap for temporarily bundling a plurality of tubes or hoses together during a medical procedure.

BACKGROUND OF THE INVENTION

There appears to be an increase in the amount of air driven or electrical instruments being used in medical procedures such as wound debridement, arthroscopic surgery or total joint surgery. As the number of these types of devices increase, the number of power cords or air hoses increases. Further, the surgical environment often can become entangled in tubing use for suction, intravenous medications, and irrigation, for example. What is desired is a device which can be wrapped around adjacent tubing or hoses to bundle the tubing or hoses together to clear up the environment of the procedure. It is also desirable that the tubing strap be sterilizable with the tubing to which it is connected.

SUMMARY OF THE INVENTION

The tube strap of this invention includes a first end having a hole for accommodating a tube therethrough and a second hook end having a handle extending generally transverse to the hook end. The first and second ends are spaced by a shaft portion. The tube strap is flexible and is preferably formed from a silicone substance which can sustain repeated sterilization without detrimentally effecting its integrity. In use, the tube strap is carried by a support tube or hose passing through the opening in the first end. It is preferred that the strap be slid onto the tube by the supplier of the tubing at the time of manufacturing. The tube strap may be used in three basic variations to bundle or restrain tubes or hoses in a more manageable grouping. The strap could be wrapped around adjacent tubes with the hook engaging the shaft. The strap can be wrapped around adjacent tubes with the hook engaging the support tube which passes through the first end. Finally, the strap can be used as a hanger, with the hook engaging a support arm or tube.

Accordingly, it is an object of the invention to provide for a novel tube strap for use in medical procedures.

Another object of the invention is to provide for a tube strap having a hook shaped end.

Another object of the invention is to provide for a tube strap which is supported at one end by a first tube and which includes a shaft for wrapping about tubes adjacent said support tube.

Other objects of this invention will become apparent upon a reading of the following description taken with the accompanying drawings.

BRIEF DESCRIPTION OF THE DRAWINGS

FIG. 1 is a perspective view of the tube strap of the invention.

FIGS. 2 through 4 illustrate the tube strap of FIG. 1 in use in a variety of positions.

DESCRIPTION OF THE PREFERRED EMBODIMENT

The preferred embodiment herein described is not intended to be exhaustive or to limit the invention to the precise form disclosed. Rather, it is chosen and described to best explain the invention so that others skilled in the art might utilize its teachings.

Referring now to FIG. 1, tubing strap 10 is illustrated and includes a first end 12 having a hole 14 therethrough and a second end 16 having a general hook shaped configuration. Ends 12 and 16 are integrally connected by a shaft 18. A handle 20 extends from end 16 generally transverse to shaft 18 and provides a gripping surface for the user. End 16 is formed having three contiguous openings 22 formed therethrough as illustrated. A break 24 is cut adjacent one opening 22 and handle 20 so that the hooked shaped end 16 may be spread open. Tubing strap 10 is preferably formed from a silicone base material yielding a high degree of flexibility and strength. Preferably, the silicone material is sterilizable.

In use, it is preferable that tubing strap 10 be slid onto a first tube 26 during manufacturing of tube 26 which would generally be part of a tubing set (not shown). As illustrated in FIG. 2, shaft 18 can be wrapped around one or more adjacent tubes 28 with the hook shaped second end 16 hooking around a portion of the shaft 16 to bundle the adjacent tubes 28 in proximity to the first tube 26. To release the adjacent tubes, the user pulls handle 20 to flex the hook shaped second end 16 open to disengage shaft 18. FIG. 3 illustrates a variation of the use of tube strap 10. In FIG. 3, tubing strap 10 is bundled about adjacent tubes 28 and the hook shaped second end 16 is hooked over the first tube 26. As illustrated, the first tube 26 is accommodated within one of the openings 22 of end 16. The tubing strap is disengaged by pulling on handle 20 to spread end 16 and release the first tubing 26 therefrom.

Finally, FIG. 4 illustrates yet another variation of the use of the tubing strap 10. As shown in the mode of operation of FIG. 4, the tubing strap 10 acts more as a hanger. First tube 26 passes through opening 14 of end 12. The hooked shaped second end 16 is hooked over a second tube 28 to suspend tube 26 the length of shaft 18. It should be understood that the tubing strap 10 could hang from an IV pole or other suitable hanger and does not necessarily need to engage a tube 28 when used in the embodiment of FIG. 4.

It should also be understood that the invention should not be limited to the precise details given above, but may be modified in keeping with the appended claims.

I claim:

1. A flexible medical tubing strap for supporting a tube adjacent a support, the tubing strap including a first end for connection to the tube and a second end for connection to the support, the second end being substantially hook shaped and defining apertures for accommodating a portion of the support, the first and second ends being spaced apart by an integral shaft.

2. The tubing strap of claim 1, wherein the apertures of the second end are at least two contiguous annular openings formed through the second end.

3. The tubing strap of claim 1 and including a handle extending from the second end.

4. The tubing strap of claim 1 wherein the support is an adjacent tube.

5. A flexible tubing strap for bundling at least one adjacent tube to a first tube, the tubing strap including a first end having an opening therethrough for accommodating the first tube and a second end being substantially hook shaped for hooking the tubing strap to a support, a flexible shaft extending between the first end and the second end, the shaft forming a means for retaining the at least one adjacent tube adjacent the first tube when the second end is connected to the support, the second end including an aperture for accommodating the support.

6. The flexible tubing strap of claim 5 wherein the aperture in the second end includes the at least two contiguous openings and a handle extending from the second end adjacent the aperture, the handle provides means for opening the second end to accommodate the support.

7. The flexible tubing strap of claim 5 wherein the support is the first tube wherein the at least one adjacent tube is cradled by the shaft.

8. The flexible tubing strap of claim 5 wherein the support is the shaft such that the at least one adjacent tube is encircled by the shaft and second end.

* * * * *